US012809345B2

(12) United States Patent
Kobayashi

(10) Patent No.: US 12,809,345 B2
(45) Date of Patent: Nov. 24, 2026

(54) SAFETY MODULE AND MODULE COUPLING BODY

(71) Applicant: SMC CORPORATION, Tokyo (JP)

(72) Inventor: Yuri Kobayashi, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 942 days.

(21) Appl. No.: 18/174,780

(22) Filed: Feb. 27, 2023

(65) Prior Publication Data

US 2024/0142946 A1 May 2, 2024

(30) Foreign Application Priority Data

Oct. 27, 2022 (JP) ................................ 2022-172228

(51) Int. Cl.
*F15B 13/08* (2006.01)
*F15B 19/00* (2006.01)
(Continued)

(52) U.S. Cl.
CPC .......... *G05B 19/416* (2013.01); *F15B 13/085* (2013.01); *F15B 19/005* (2013.01);
(Continued)

(58) Field of Classification Search
CPC ...... F15B 13/085; F15B 19/005; F15B 20/00; F15B 20/002; F15B 20/008; G05B 9/02;
(Continued)

(56) References Cited

U.S. PATENT DOCUMENTS

| | | | |
|---|---|---|---|
| 2009/0045363 A1 | 2/2009 | Kremser et al. |
| 2017/0356475 A1 | 12/2017 | Hamm et al. |

(Continued)

FOREIGN PATENT DOCUMENTS

| | | | |
|---|---|---|---|
| EP | 3 786 502 A1 | 3/2021 |
| WO | WO 2013/076173 A1 | 5/2013 |

(Continued)

OTHER PUBLICATIONS

Japanese Office Action issued Sep. 26, 2023 in Japanese Patent Application No. 2022-172228 (with English language translation), 14 pages.

(Continued)

*Primary Examiner* — Levi Gannon
(74) *Attorney, Agent, or Firm* — Oblon, McClelland, Maier & Neustadt, L.L.P.

(57) ABSTRACT

A safety module which is able to communicate with a control device that performs a control on a valve module, is equipped with a safety control processing circuit that carries out a safety control communication with the control device, a connection terminal and a safety control wiring used in the safety control communication, an operation control processing circuit that performs an operation control communication with the control device, and outputs an operation control signal, an input terminal to which the operation control communication is input, an operation control wiring used in the operation control communication, and an output terminal which is able to output the operation control signal to the valve module.

12 Claims, 9 Drawing Sheets

(51) Int. Cl.

| | |
|---|---|
| ***F15B 20/00*** | (2006.01) |
| ***G05B 9/02*** | (2006.01) |
| ***G05B 19/042*** | (2006.01) |
| ***G05B 19/416*** | (2006.01) |
| *H02M 3/04* | (2006.01) |

(52) U.S. Cl.
CPC .......... *F15B 20/002* (2013.01); *F15B 20/008* (2013.01); *G05B 9/02* (2013.01); *G05B 19/0428* (2013.01); *G05B 2219/45006* (2013.01); *H02M 3/04* (2013.01)

(58) Field of Classification Search
CPC .............. G05B 19/0428; G05B 19/416; G05B 2219/45006
See application file for complete search history.

(56) References Cited

U.S. PATENT DOCUMENTS

| | | | | |
|---|---|---|---|---|
| 2018/0143594 | A1* | 5/2018 | Gehrke | G05B 9/02 |
| 2018/0306214 | A1* | 10/2018 | Cobbaut | F25J 1/0256 |
| 2019/0119934 | A1* | 4/2019 | Vierkotten | E04G 21/0445 |
| 2021/0041035 | A1* | 2/2021 | Sakamura | F15B 13/0839 |
| 2021/0385010 | A1 | 12/2021 | Miyazaki | |

FOREIGN PATENT DOCUMENTS

| | | | |
|---|---|---|---|
| WO | WO 2019/006546 | A1 | 1/2019 |
| WO | WO 2019/208491 | A1 | 10/2019 |
| WO | WO 2020/213068 | A1 | 10/2020 |

OTHER PUBLICATIONS

Extended European Search Report issued on Aug. 29, 2023 in European Patent Application No. 23158580.3, 10 pages.

Office Action issued Sep. 28, 2026, in Chinese Patent Application No. 202310169096.3, filed Feb. 27, 2023, with English machine translation (12 pages).

* cited by examiner

20B

SAFETY MODULE AND MODULE COUPLING BODY

CROSS-REFERENCE TO RELATED APPLICATIONS

This application is based upon and claims the benefit of priority from Japanese Patent Application No. 2022-172228 filed on Oct. 27, 2022, the contents of which are incorporated herein by reference.

BACKGROUND OF THE INVENTION

Field of the Invention

The present invention relates to a safety module and a module coupling body.

Description of the Related Art

In US 2009/0045363 A1, a safety module is disclosed. The safety module includes a control electronic circuit. The control electronic circuit is capable of controlling a switching device, and interrupting the supply of voltage to each module.

Interruption of the supply of voltage is performed in the case that a critical condition is detected. The critical condition is detected by a control device.

SUMMARY OF THE INVENTION

According to the disclosure of US 2009/0045363 A1, in the case that the critical condition is detected, the control device carries out a safety control communication via an internal bus line of the safety module. Stated otherwise, the control device issues an instruction to the control electronic circuit of the safety module to interrupt the supply of voltage. Furthermore, the internal bus line carries out an operation control communication in relation to an operation control of a valve module. The safety control communication and the operation control communication are performed using the same internal bus line. Accordingly, the safety control communication is restricted by the operation control communication.

The present invention has the object of solving the aforementioned problem.

A first aspect of the present invention is characterized by a safety module configured to communicate with a control device configured to perform a control on a valve module, the safety module including a safety control processing circuit configured to carry out a safety control communication in relation to a safety control of the valve module, with the control device, a connection terminal configured to be used in the safety control communication between the control device and the safety control processing circuit, a safety control wiring configured to connect the safety control processing circuit and the connection terminal, and to be used in the safety control communication, an operation control processing circuit configured to perform, with the control device, an operation control communication in relation to an operation control that differs from the safety control of the valve module, and to output an operation control signal for the valve module, based on the operation control communication, an input terminal to which the operation control communication between the control device and the operation control processing circuit is input, an operation control wiring configured to connect the operation control processing circuit and the input terminal, and to be used in the operation control communication, and an output terminal configured to output the operation control signal that has been output from the operation control processing circuit, to the valve module.

A second aspect of the present invention is characterized by a module coupling body including the safety module according to the first aspect, and further including a communication module including a control communication processing circuit configured to relay the safety control communication and the operation control communication, a first wiring used in the safety control communication relayed by the control communication processing circuit, a first terminal connected to the first wiring, a second wiring used in the operation control communication relayed by the control communication processing circuit, and a second terminal connected to the second wiring, and the communication module is disposed between the control device and the safety module and connected with the safety module.

According to the present invention, in the safety module, an adverse influence of the operation control communication on the safety control communication can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
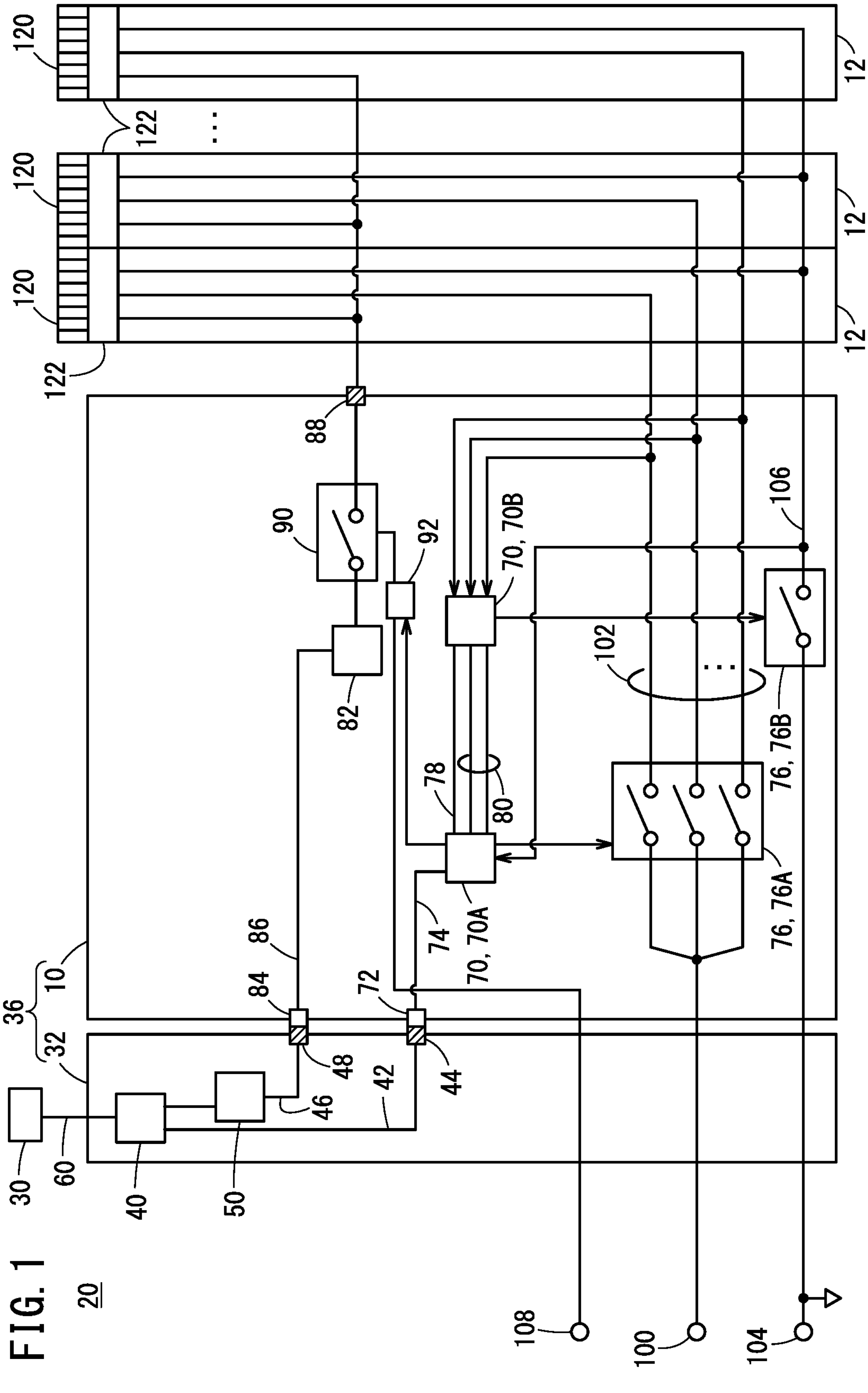
FIG. 1 is a diagram illustrating a valve system including a safety module according to an embodiment of the present invention and a plurality of valve modules.

FIG. 1 is a diagram illustrating a valve system 20 including a safety module 10 according to one embodiment of the present invention and a plurality of valve modules 12. The valve system 20 shown in FIG. 1 further includes a control device 30 that controls the plurality of valve modules 12, and a communication module 32 that relays communications in relation to the control of the valve modules 12. Each of the safety module 10, the control device 30, the communication module 32, and the valve modules 12 are separated from each other. The communication module 32 is disposed between the control device 30 and the safety module 10. The safety module 10 and the communication module 32 are mutually connected together, and thereby constitute a module coupling body 36.

The control device 30, for example, is a PLC (Programmable Logic Controller). The control device 30 performs communications in relation to control of the plurality of valve modules 12. The communications in relation to controlling each of the valve modules 12 include safety control communication in relation to a safety control of each of the valve modules 12, and operation control communication in relation to an operation control that differs from the safety control of each of the valve modules 12.

The operation control of the valve modules 12 corresponds, for example, to controlling a supply of fluid by operating the valve modules 12. The safety control of the valve modules 12 corresponds, for example, to a control to interrupt the electrical power used for performing operations (electrical power for operation) supplied to the valve modules 12 during operation of the valve modules 12, and a control to interrupt the operation control of the valve modules 12 and to safely cause the valve modules 12 to stop.

The communication module 32 includes a control communication processing circuit 40, a first wiring 42, a first terminal 44, a second wiring 46, a second terminal 48, and an internal communication processing circuit 50. The control communication processing circuit 40 relays the safety control communication and the operation control communication between the control device 30 and the safety module 10.

The first wiring 42 is used for the safety control communication that is relayed by the control communication processing circuit 40. The first wiring 42 connects the control communication processing circuit 40 and the first terminal 44. The second wiring 46 is used for the operation control communication that is relayed by the control communication processing circuit 40. The second wiring 46 connects the control communication processing circuit 40 and the second terminal 48. The internal communication processing circuit 50 is disposed on the second wiring 46.

The safety control communication and the operation control communication between the control communication processing circuit 40 and the control device 30 are both performed using a control communication line 60. It is assumed that a safety control signal for the safety control is input from the control device 30 to the control communication processing circuit 40 by way of the safety control communication in which the control communication line 60 is used. In that case, the control communication processing circuit 40 outputs the safety control signal to the first terminal 44 via the first wiring 42.

It is assumed that an operation control signal for the operation control is input from the control device 30 to the control communication processing circuit 40 by way of the operation control communication in which the control communication line 60 is used. In that case, the control communication processing circuit 40 outputs the operation control signal to the second terminal 48 via the second wiring 46 and the internal communication processing circuit 50.

It is assumed that the safety control signal for the safety control is input from the safety module 10 to the control communication processing circuit 40 via the first terminal 44 and the first wiring 42. In that case, the control communication processing circuit 40 outputs the safety control signal to the control device 30 via the control communication line 60. It is assumed that the operation control signal for the operation control is input from the safety module 10 to the control communication processing circuit 40 via the second terminal 48, the second wiring 46, and the internal communication processing circuit 50. In that case, the control communication processing circuit 40 outputs the operation control signal to the control device 30 via the control communication line 60.

The internal communication processing circuit 50 performs the operation control communication with the safety module 10, for example, using a communication protocol CAN FD (Controller Area Network with Flexible Data Rate). The internal communication processing circuit 50 performs a termination process of the connection in accordance with the communication protocol CAN FD. A processing function to terminate the connection in accordance with the communication protocol CAN FD may be provided inside the control communication processing circuit 40. In that case, the internal communication processing circuit 50 is unnecessary.

Moreover, it should be noted that the operation control communication between the internal communication processing circuit 50 and the safety module 10 may use another type of communication protocol rather than CAN FD. For example, communication protocols such as CAN (Controller Area Network), Ethernet (registered trademark), SPI (Serial Peripheral Interface), RS-485, USB (Universal Serial Bus) or the like may be used.

The safety module 10 includes a safety control processing circuit 70, a connection terminal 72, a safety control wiring 74, a first switching circuit 76, a bidirectional communication line 78, a pair of unidirectional communication lines 80, an operation control processing circuit 82, an input terminal 84, an operation control wiring 86, an output terminal 88, a signal output circuit 90, and a voltage conversion circuit 92. Since the safety module 10 is a replaceable module, in the case that the safety module 10 has malfunctioned, it is not necessary to replace the entire module coupling body 36. Only the safety module 10 that has malfunctioned needs to be replaced.

The safety control processing circuit 70 carries out the safety control communication with the control device 30 via the control communication processing circuit 40 of the communication module 32. The connection terminal 72 is used in carrying out the safety control communication. The connection terminal 72 is connected to the first terminal 44 of the communication module 32. The safety control wiring 74 connects the safety control processing circuit 70 and the connection terminal 72, and is used in carrying out the safety control communication. More specifically, the safety control processing circuit 70 carries out the safety control communication with the control device 30 via the connection terminal 72 and the safety control wiring 74. On the basis of the safety control communication, the safety control processing circuit 70 outputs the safety control signal for the safety control to the first switching circuit 76 and the voltage conversion circuit 92.

The safety control processing circuit 70 includes a first safety control processing circuit 70A and a second safety control processing circuit 70B. Between the first safety control processing circuit 70A and the second safety control processing circuit 70B, the bidirectional communication line 78 and the pair of unidirectional communication lines 80 are provided in order to enable communications between the first safety control processing circuit 70A and the second safety control processing circuit 70B. The first safety control processing circuit 70A carries out the safety control communication with the control device 30 via the connection terminal 72 and the safety control wiring 74. The second safety control processing circuit 70B carries out the safety control communication with the control device 30 via the first safety control processing circuit 70A and the pair of unidirectional communication lines 80. Moreover, of the first safety control processing circuit 70A and the second safety control processing circuit 70B, the safety control wiring 74 is connected to the first safety control processing circuit 70A.

The first switching circuit 76 switches between a state of supplying the electrical power used for performing operations to each of the valve modules 12 and a state of not supplying the electrical power thereto, in accordance with the safety control signal that is output from the safety control processing circuit 70. The first switching circuit 76 includes a high side switch 76A and a low side switch 76B.

In the example shown in FIG. 1, the high side switch 76A is provided in each of the valve modules 12. Accordingly, it is possible to supply the electrical power used for performing operations and to stop the supply of the electrical power used for performing operations only to specified ones of the valve modules 12. Moreover, in the case that the plurality of the valve modules 12 are divided into a plurality of groups and the operation thereof is controlled, the high side switch 76A may be provided in each of the groups. One low side switch 76B is provided with respect to all of the valve modules 12.

The high side switch 76A is placed on an electrical power line 102 connected to a positive electrode 100 of an electrical power source of the electrical power used for performing operations that is supplied to each of the valve modules 12. The low side switch 76B is placed on an electrical power line 106 connected to a negative electrode 104 of the electrical power source of the electrical power used for performing operations that is supplied to each of the valve modules 12. Stated otherwise, the high side switch 76A is connected to the electrical power source for the valve modules 12, and the low side switch 76B is connected to ground.

On the basis of the safety control communication, the first safety control processing circuit 70A outputs the safety control signal for the safety control to the high side switch 76A. By outputting the safety control signal, the first safety control processing circuit 70A turns ON or turns OFF the high side switch 76A. FIG. 1 shows an example in which the high side switch 76A is turned OFF. By measuring the electric potential of the electrical power line 102, the second safety control processing circuit 70B detects whether the high side switch 76A is in a connected state of being turned ON or turned OFF.

The first safety control processing circuit 70A notifies the second safety control processing circuit 70B of the content of the safety control signal that has been output to the high side switch 76A, via the bidirectional communication line 78. Based on a comparison of the content of the safety control signal that has been output from the first safety control processing circuit 70A to the high side switch 76A with the detection result detected by the second safety control processing circuit 70B, the second safety control processing circuit 70B diagnoses the condition of the high side switch 76A.

On the basis of the safety control communication, the second safety control processing circuit 70B outputs the safety control signal for the safety control to the low side switch 76B. By outputting the safety control signal, the second safety control processing circuit 70B turns ON or turns OFF the low side switch 76B. FIG. 1 shows an example in which the low side switch 76B is turned OFF. By measuring the electric potential of the electrical power line 106, the first safety control processing circuit 70A detects whether the low side switch 76B is in a connected state of being turned ON or turned OFF.

The second safety control processing circuit 70B notifies the first safety control processing circuit 70A of the content of the safety control signal that has been output to the low side switch 76B, via the bidirectional communication line 78. Based on a comparison of the content of the safety control signal that has been output from the second safety control processing circuit 70B to the low side switch 76B with the detection result detected by the first safety control processing circuit 70A, the first safety control processing circuit 70A diagnoses the condition of the low side switch 76B.

As noted previously, in the diagnosis of the condition of the high side switch 76A, the second safety control processing circuit 70B compares the content of the safety control signal that has been output from the first safety control processing circuit 70A to the high side switch 76A with the detection result detected by the second safety control processing circuit 70B. When the content of the safety control signal and the detection result do not coincide, the second safety control processing circuit 70B detects that the condition of the high side switch 76A is abnormal.

In that case, the second safety control processing circuit 70B turns the low side switch 76B OFF. The supply of electrical power used for performing operations to each of the valve modules 12 is interrupted. The operations of the valve modules 12 are safely stopped. The second safety control processing circuit 70B issues a notification to the first safety control processing circuit 70A via the bidirectional communication line 78, to the effect that the low side switch 76B has been turned OFF. The first safety control processing circuit 70A issues the notification to the control device 30 to the effect that the low side switch 76B has been turned OFF, by way of the safety control communication described above.

As noted previously, in the diagnosis of the condition of the low side switch 76B, the first safety control processing circuit 70A compares the content of the safety control signal that has been output from the second safety control processing circuit 70B to the low side switch 76B with the detection result detected by the first safety control processing circuit 70A. When the content of the safety control signal and the detection result do not coincide, the first safety control processing circuit 70A detects that the condition of the low side switch 76B is abnormal.

In that case, the first safety control processing circuit 70A turns each high side switch 76A OFF. The supply of electrical power used for performing operations to each of the valve modules 12 is interrupted. The operations of the valve modules 12 are safely stopped. The first safety control processing circuit 70A issues a notification to the second safety control processing circuit 70B via the bidirectional communication line 78, to the effect that the high side switch 76A has been turned OFF. The second safety control processing circuit 70B issues the notification to the control device 30 to the effect that the high side switch 76A has been turned OFF, by way of the safety control communication described above.

The first safety control processing circuit 70A controls the state of the high side switch 76A, and monitors the condition of the low side switch 76B. The second safety control processing circuit 70B controls the state of the low side switch 76B, and monitors the condition of the high side switch 76A. The combination of the first safety control processing circuit 70A and the high side switch 76A is defined as a first combination. The combination of the second safety control processing circuit 70B and the low side switch 76B is defined as a second combination. In the case that one of the first combination and the second combination is in an abnormal condition, due to the fact that the other combination operates normally, the safety control of the valve modules 12 can be carried out more appropriately.

The operation control processing circuit 82 carries out the operation control communication with the control device 30 via the control communication processing circuit 40 and the internal communication processing circuit 50 of the communication module 32. The input terminal 84 is used in carrying out the operation control communication. The input terminal 84 is connected to the second terminal 48 of the communication module 32. The operation control wiring 86 connects the operation control processing circuit 82 and the input terminal 84, and is used in carrying out the operation control communication. On the basis of the operation control communication, the operation control processing circuit 82 outputs the operation control signal for the valve modules 12, to the valve modules 12.

The communication protocol CAN FD described above is used in the operation control communication on the operation control wiring 86. The operation control processing circuit 82 carries out the termination process of the connection in accordance with the communication protocol CAN FD between the internal communication processing circuit 50 of the communication module 32 and the operation control processing circuit 82. Moreover, it should be noted that, as the communication protocol between the internal communication processing circuit 50 and the operation control processing circuit 82, another type of communication protocol rather than CAN FD may be used.

The safety control processing circuit 70 and the operation control processing circuit 82 are separately provided in the safety module 10. Thus, in the case that the addition of a function in relation to the operation control of the valve modules 12 is carried out, it is sufficient to update only the function of the operation control processing circuit 82. If the safety control and the operation control for the valve modules 12 are performed in the same processing circuit, cases may occur in which a malfunction in the safety control may arise due to the addition of the function for the operation control. However, such a malfunction does not occur in the present embodiment. When the addition of the function in relation to the operation control is performed, there is no need to reconfirm whether or not the safety control processing circuit 70 satisfies the security standard.

The safety control wiring 74 and the operation control wiring 86 are separately provided in the safety module 10. In the safety module 10, an adverse influence of the operation control communication on the safety control communication can be suppressed.

In the case that the signal output circuit 90 has been turned ON, the output terminal 88 becomes capable of outputting the operation control signal that is output from the operation control processing circuit 82, to the valve modules 12. The signal output circuit 90, for example, is a photocoupler, and is connected to an electrical power source 108 for the electrical power used in the controls (electrical power for control), via the voltage conversion circuit 92. On the basis of the safety control communication, the first safety control processing circuit 70A outputs the safety control signal for the safety control to the voltage conversion circuit 92 in addition to the high side switch 76A.

In the case that the safety control signal that is output from the first safety control processing circuit 70A to the voltage conversion circuit 92 is an ON signal, the voltage conversion circuit 92 is turned ON. In that case, the voltage conversion circuit 92 converts the voltage of the electrical power supplied from the electrical power source 108 of the electrical power for the controls, and then supplies the electrical power whose voltage has been converted, to the signal output circuit 90. In the case that the safety control signal that is output from the first safety control processing circuit 70A to the voltage conversion circuit 92 is an OFF signal, the voltage conversion circuit 92 is turned OFF. In that case, the voltage conversion circuit 92 interrupts the supply of electrical power from the electrical power source 108 of the electrical power used in the controls, to the signal output circuit 90.

The signal output circuit 90 switches between a state of outputting the operation control signal to the valve modules 12 via the output terminal 88 and a state of not outputting the operation control signal, in accordance with the safety control signal. In the case that the safety control signal is the ON signal, the voltage conversion circuit 92 is turned ON, and since electrical power is supplied to the signal output circuit 90, the signal output circuit 90 outputs the operation control signal to the valve modules 12 (refer to FIG. 2). In the case that the safety control signal is the OFF signal, the voltage conversion circuit 92 is turned OFF, and since the supply of electrical power to the signal output circuit 90 is interrupted, the signal output circuit 90 does not output the operation control signal to the valve modules 12 (refer to FIG. 1). In the case that the operation control signal is not output to the valve modules 12, the operations of the valve modules 12 are safely stopped.

The signal output circuit 90 outputs the operation control signal from the operation control processing circuit 82 to the valve modules 12, only in the case that the safety control signal is the ON signal. In the case that the safety control signal is the OFF signal, in addition to interrupting of the supply of the operating power to the valve modules 12, it is possible to safely stop the valve modules 12, and thus the safety of the valve system 20 is increased.

The valve modules 12 include a plurality of valves 120, and drivers 122 that respectively cause the plurality of valves 120 to open and close. The valves 120, for example, are solenoid valves. Each of the drivers 122 is connected to the positive electrode 100 and the negative electrode 104 of the electrical power source of the electrical power used for performing operations supplied to the valve modules 12. The driver 122 is connected to the positive electrode 100 of the electrical power source of the electrical power used for performing operations, via the high side switch 76A that is placed on the electrical power line 102. The driver 122 is connected to the negative electrode 104 of the electrical power source of the electrical power used for performing operations, via the low side switch 76B that is placed on the electrical power line 106.

The drivers 122 open and close the valves 120 in accordance with the operation control signal that is output from the operation control processing circuit 82 of the safety module 10 to the valve modules 12. The driver 122 causes the valve 120 to be opened and closed using the electrical power source of the electrical power used for performing operations. When the driver 122 opens the valve 120, the valve 120 supplies a fluid to a supply target device to which the fluid is supplied. When the driver 122 closes the valve 120, the fluid that is supplied by the valve 120 to the supply target device is interrupted.

Figure 2:
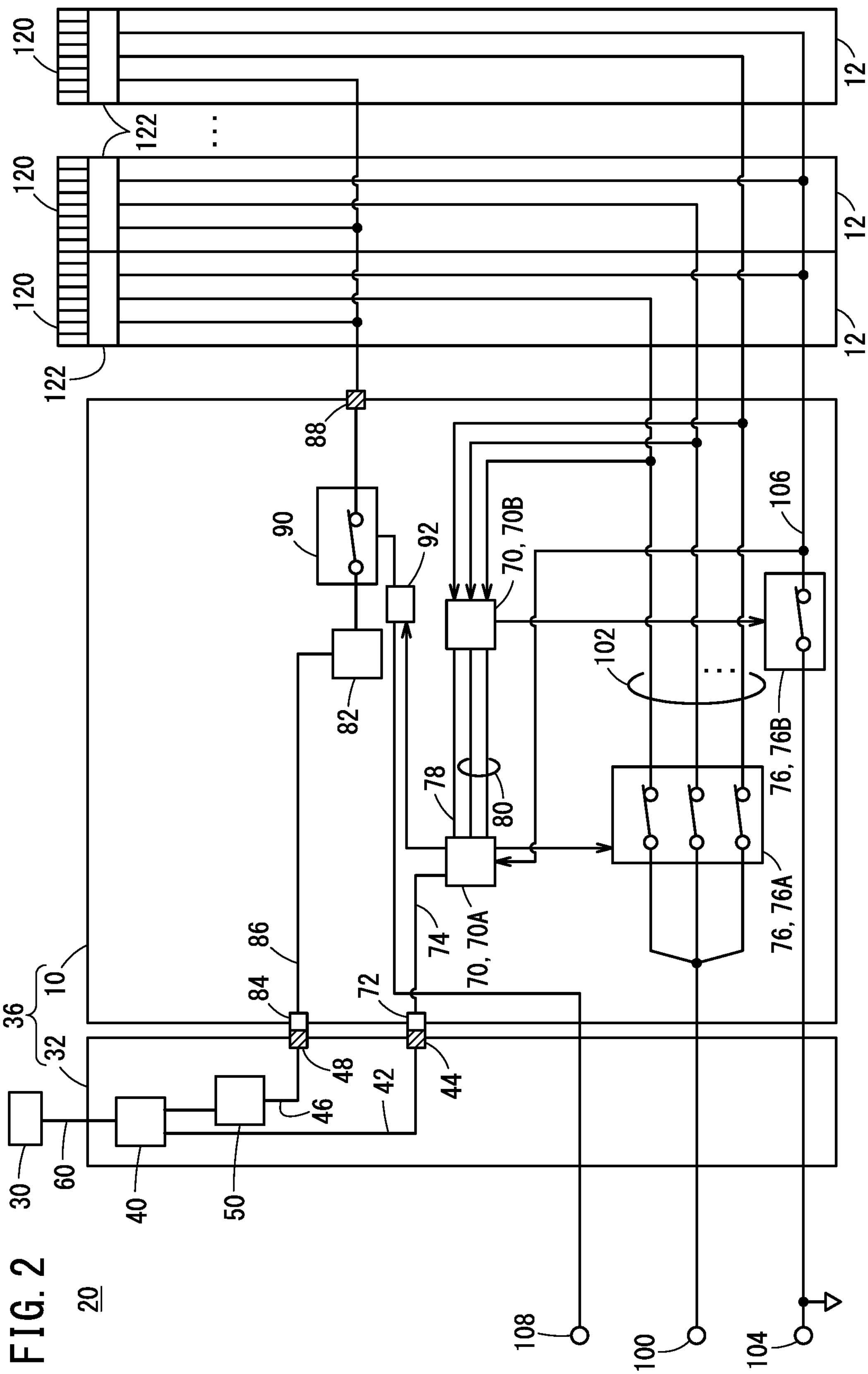
FIG. 2 is a diagram illustrating a manner in which electrical power used for performing operations is supplied to the valve modules.

FIG. 2 is a diagram illustrating a manner in which the electrical power used for performing operations is supplied to the valve modules 12. As noted previously, the first safety control processing circuit 70A turns ON or turns OFF the high side switch 76A. In the case that the safety control signal output by the first safety control processing circuit 70A is the ON signal, the high side switch 76A is turned ON (refer to FIG. 2). In the case that the safety control signal output by the first safety control processing circuit 70A is the OFF signal, the high side switch 76A is turned OFF (refer to FIG. 1).

As noted previously, the second safety control processing circuit 70B turns ON or turns OFF the low side switch 76B. In the case that the safety control signal output by the second safety control processing circuit 70B is the ON signal, the low side switch 76B is turned ON (refer to FIG. 2). In the case that the safety control signal output by the second safety control processing circuit 70B is the OFF signal, the low side switch 76B is turned OFF (refer to FIG. 1).

In the case that the safety control signal is the ON signal, due to both of the high side switch 76A and the low side switch 76B being turned ON, the electrical power used for performing operations is supplied to the valve modules 12 (refer to FIG. 2). In the case that the safety control signal is the OFF signal, due to at least one of the high side switch 76A or the low side switch 76B being turned OFF, the supply of the electrical power used for performing operations to the valve modules 12 is shut off (refer to FIG. 1). Thus, a safe supply of electrical power used for performing operations to the valve modules 12 is realized.

Figure 3:
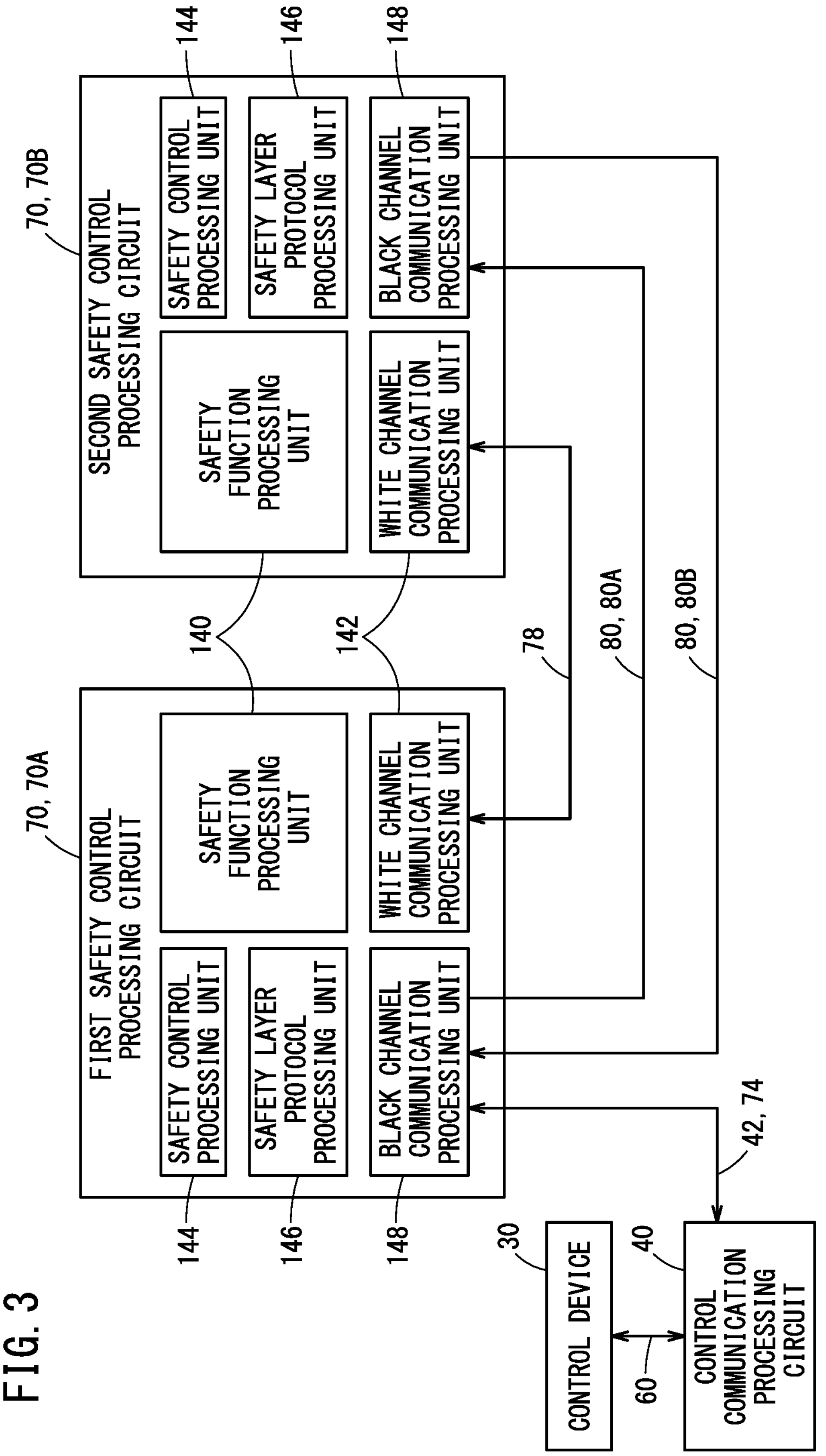
FIG. 3 is a block diagram schematically showing configurations of a first safety control processing circuit and a second safety control processing circuit.

FIG. 3 is a block diagram schematically showing configurations of the first safety control processing circuit 70A and the second safety control processing circuit 70B. The first safety control processing circuit 70A and the second safety control processing circuit 70B serve as the safety control processing circuit 70 of the safety module 10. The safety control processing circuit 70 includes a processor such as a CPU (central processing unit), a GPU (graphics processing unit) or the like. The safety control processing circuit 70 includes a safety function processing unit 140, a white channel communication processing unit 142, a safety control processing unit 144, a safety layer protocol processing unit 146, and a black channel communication processing unit 148.

By the safety control processing circuit 70 executing a program stored in a non-illustrated storage unit, the safety function processing unit 140, the white channel communication processing unit 142, the safety control processing unit 144, the safety layer protocol processing unit 146, and the black channel communication processing unit 148 are realized. At least a portion of the safety function processing unit 140, the white channel communication processing unit 142, the safety control processing unit 144, the safety layer protocol processing unit 146, and the black channel communication processing unit 148 may be implemented by an integrated circuit such as an ASIC, an FPGA, or the like, or alternatively, may be implemented by an electronic circuit including a discrete device.

By the safety function processing unit 140 of the first safety control processing circuit 70A outputting the safety control signal to the high side switch 76A via a non-illustrated control signal line, the high side switch 76A is turned ON or turned OFF. The safety function processing unit 140 of the first safety control processing circuit 70A notifies the safety function processing unit 140 of the second safety control processing circuit 70B of the content of the safety control signal that has been output to the high side switch 76A. The content of the safety control signal is notified via the white channel communication processing unit 142 and the bidirectional communication line 78.

Based on a comparison of the content of the safety control signal that has been output from the first safety control processing circuit 70A with the detection result detected by the second safety control processing circuit 70B, the safety function processing unit 140 of the second safety control processing circuit 70B diagnoses the condition of the high side switch 76A. In the case that the safety function processing unit 140 of the second safety control processing circuit 70B has detected an abnormality in the high side switch 76A, by the safety function processing unit 140 of the second safety control processing circuit 70B outputting a safety control signal to the low side switch 76B via a non-illustrated control signal line, the low side switch 76B is turned OFF. The safety function processing unit 140 of the second safety control processing circuit 70B issues a notification to the safety function processing unit 140 of the first safety control processing circuit 70A, to the effect that the low side switch 76B has been turned OFF. Such a notification is carried out via the white channel communication processing unit 142 and the bidirectional communication line 78.

By the safety function processing unit 140 of the second safety control processing circuit 70B outputting a safety control signal to the low side switch 76B via a non-illustrated control signal line, the low side switch 76B is turned ON or turned OFF. The safety function processing unit 140 of the second safety control processing circuit 70B notifies the safety function processing unit 140 of the first safety control processing circuit 70A of the content of the safety control signal that has been output to the low side switch 76B. The content of the safety control signal is notified via the white channel communication processing unit 142 and the bidirectional communication line 78.

Based on a comparison of the content of the safety control signal that is output from the second safety control processing circuit 70B with the detection result detected by the first safety control processing circuit 70A, the safety function processing unit 140 of the first safety control processing circuit 70A diagnoses the condition of the low side switch 76B. In the case that the safety function processing unit 140 of the first safety control processing circuit 70A has detected an abnormality in the low side switch 76B, by the safety function processing unit 140 of the first safety control processing circuit 70A outputting a safety control signal to the high side switch 76A via a non-illustrated control signal line, the high side switch 76A is turned OFF. The safety function processing unit 140 of the first safety control processing circuit 70A issues a notification to the safety function processing unit 140 of the second safety control processing circuit 70B, to the effect that the high side switch 76A has been turned OFF. Such a notification is carried out via the white channel communication processing unit 142 and the bidirectional communication line 78.

The white channel communication processing unit 142 processes the communications between the safety function processing unit 140 of the first safety control processing circuit 70A and the safety function processing unit 140 of the second safety control processing circuit 70B. The communications between the safety function processing unit 140 of the first safety control processing circuit 70A and the safety function processing unit 140 of the second safety control processing circuit 70B are communications concerned with safety functions. Therefore, a dedicated communication protocol that satisfies a predetermined security standard is applied to such communications carried out via the bidirectional communication line 78. The communications of this type are referred to as white channel communications.

The safety control processing unit 144 of the first safety control processing circuit 70A carries out the safety control communication with the control device 30. On the basis of the safety control communication, the safety control processing unit 144 of the first safety control processing circuit 70A notifies the safety function processing unit 140 of the content of the instruction in relation to the safety control from the control device 30. In the case that the notified content is to instruct the outputting of the safety control signal to the high side switch 76A, the safety function processing unit 140 outputs the safety control signal to the high side switch 76A in the manner described above. In accordance with the safety control signal that has been output, the high side switch 76A is turned ON or turned OFF.

The pair of unidirectional communication lines 80 are disposed between the first safety control processing circuit 70A and the second safety control processing circuit 70B. The pair of unidirectional communication lines 80 include a unidirectional communication line 80A that allows communications in a direction from the first safety control processing circuit 70A to the second safety control processing circuit 70B, and a unidirectional communication line 80B that allows communications in the opposite direction.

The safety control processing unit 144 of the first safety control processing circuit 70A transfers the safety control signal from the control device 30 to the safety control processing unit 144 of the second safety control processing circuit 70B via the unidirectional communication line 80A. The safety control processing unit 144 of the first safety control processing circuit 70A acquires the safety control signal from the safety control processing unit 144 of the second safety control processing circuit 70B via the unidirectional communication line 80B. The safety control processing unit 144 of the first safety control processing circuit 70A transfers the safety control signal that has been acquired from the safety control processing unit 144 of the second safety control processing circuit 70B, to the control device 30. Thus, the safety control processing unit 144 of the second safety control processing circuit 70B carries out the safety control communication with the control device 30 via the first safety control processing circuit 70A.

It is necessary for the communications between the safety control processing unit 144 of the first safety control processing circuit 70A and the safety control processing unit 144 of the second safety control processing circuit 70B to satisfy a predetermined security standard. In order to satisfy such a security standard, the safety layer protocol processing unit 146 performs a safety layer protocol process in relation to the safety of the communications in the pair of unidirectional communication lines 80.

By performing the safety layer protocol process, a general-purpose communication protocol can be applied to the communications carried out via the unidirectional communication line 80A and the unidirectional communication line 80B. The black channel communication processing unit 148 processes the communications by way of such a general-purpose communication protocol that takes as a premise the safety layer protocol process. The communications of this type are referred to as black channel communications. The general-purpose communication protocol, for example, is a CAN FD, CAN, SPI, or UART (Universal Asynchronous Receiver/Transmitter) communication protocol or the like.

The safety control communication between the safety control processing unit 144 of the first safety control processing circuit 70A and the control device 30 is carried out via the control communication line 60, the control communication processing circuit 40 and the first wiring 42 of the communication module 32, and the safety control wiring 74 of the safety module 10. The control communication processing circuit 40 includes a safety layer protocol processing function and a black channel communication processing function.

The safety layer protocol process in relation to the safety of the communications in the first wiring 42 and the safety control wiring 74 is performed by the control communication processing circuit 40 and the safety control processing unit 144 of the first safety control processing circuit 70A. It is possible to apply the black channel communication to the safety control communications between the control communication processing circuit 40 and the safety control processing unit 144 of the first safety control processing circuit 70A via the first wiring 42 and the safety control wiring 74.

Two types of communication lines are used in the communications between the safety control processing unit 144 of the first safety control processing circuit 70A and the safety control processing unit 144 of the second safety control processing circuit 70B. The two types of communication lines are the bidirectional communication line 78 and the pair of unidirectional communication lines 80. The operation control communication in which the unidirectional communication lines 80 are used, and mutual monitoring of the conditions of the high side switch 76A and the low side switch 76B in which the bidirectional communication line 78 is used do not interfere with each other. Since a general-purpose communication protocol can be applied to the black channel communications via the unidirectional communication lines 80, the degree of freedom in relation to designing the communication method is high.

In the safety module 10 according to the present embodiment, on the basis of the safety control communication with the control device 30, the safety control processing circuit 70 outputs the safety control signal to the first switching circuit 76 and the voltage conversion circuit 92. The first switching circuit 76 includes the high side switch 76A and the low side switch 76B. In the case that the safety control signal, which is input to either one of the high side switch 76A and the low side switch 76B, is the OFF signal, that switch is turned OFF. In that case, the supply of electrical power used for performing operations to each of the valve modules 12 is interrupted. In that case, the operations of the valve modules 12 are safely stopped.

On the basis of the operation control communication with the control device 30, the operation control processing circuit 82 outputs the operation control signal to the valve modules 12 via the signal output circuit 90. In the case that the safety control signal input to the voltage conversion circuit 92 is the OFF signal, since the supply of electrical power to the signal output circuit 90 is interrupted, the signal output circuit 90 is turned OFF. Since the signal output circuit 90 is turned OFF, the operation control signal is not output to the valve modules 12. In that case, the operations of the valve modules 12 are safely stopped.

The first safety control processing circuit 70A controls the state of the high side switch 76A, and monitors the condition of the low side switch 76B. The first safety control processing circuit 70A notifies the second safety control processing circuit 70B of the control content in relation to the connected state of the high side switch 76A. The second safety control processing circuit 70B controls the state of the low side switch 76B, and monitors the condition of the high side switch 76A. The second safety control processing circuit 70B notifies the first safety control processing circuit 70A of the control content in relation to the connected state of the low side switch 76B.

In the case it is detected that the condition of the high side switch 76A is abnormal, the second safety control processing circuit 70B turns the low side switch 76B OFF. In the case it is detected that the condition of the low side switch 76B is abnormal, the first safety control processing circuit 70A turns the high side switch 76A OFF. In both of these cases, the valve modules 12 are safely stopped.

EXEMPLARY MODIFICATIONS

The above-described embodiment may be modified in the following manner.

Exemplary Modification 1

Figure 4:
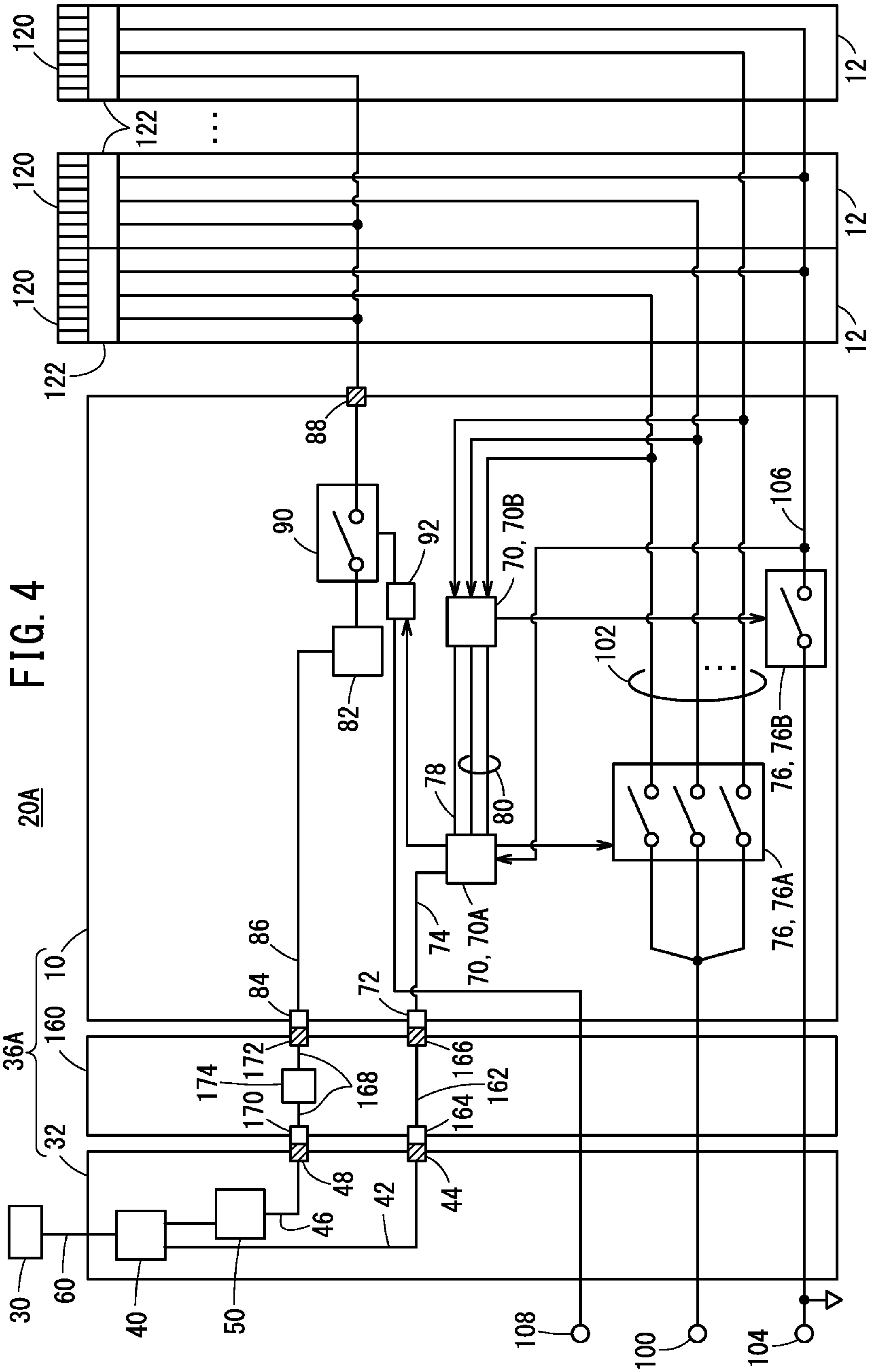
FIG. 4 is a diagram illustrating a valve system including a module coupling body in which an additional module is arranged between a communication module and the safety module.

The module coupling body 36 may further include at least one additional module, in addition to the safety module 10 and the communication module 32. FIG. 4 is a diagram illustrating a valve system 20A including a module coupling body 36A in which an additional module 160 is arranged between the communication module 32 and the safety module 10. FIG. 4 shows an example in which one additional module 160 is arranged between the communication module 32 and the safety module 10.

The configuration of the valve system 20A apart from the additional module 160 shown in FIG. 4 is the same as that shown in FIG. 1, and the same reference numerals as in FIG. 1 are used. In FIG. 4, descriptions concerning constituent members denoted by the same reference numerals as those shown in FIG. 1 overlap with those features shown in FIG. 1, and therefore descriptions of such features are omitted herein. The safety module 10 and the additional module 160 are mutually connected together. The additional module 160 and the communication module 32 are mutually connected together. The safety module 10, the additional module 160, and the communication module 32, which are mutually connected together constitute the module coupling body 36A.

The additional module 160 includes a third wiring 162, a third terminal 164, a fourth terminal 166, a fourth wiring 168, a fifth terminal 170, a sixth terminal 172, and a function control processing circuit 174. The third wiring 162 is used in carrying out the safety control communication. The third terminal 164 is connected to one end of the third wiring 162. The fourth terminal 166 is connected to the other end of the third wiring 162.

The third terminal 164 is closer to the communication module 32 than the fourth terminal 166. In the example shown in FIG. 4, the third terminal 164 is connected to the first terminal 44 of the communication module 32. The fourth terminal 166 is closer to the safety module 10 than the third terminal 164. In the example shown in FIG. 4, the fourth terminal 166 is connected to the connection terminal 72 of the safety module 10.

The fourth wiring 168 is used in carrying out the operation control communication. A communication protocol such as a CAN FD, CAN, Ethernet, SPI, RS-485, USB communication protocol or the like is used for the operation control communication on the fourth wiring 168. The fifth terminal 170 is connected to one end of the fourth wiring 168. The sixth terminal 172 is connected to the other end of the fourth wiring 168.

The fifth terminal 170 is closer to the communication module 32 than the sixth terminal 172. In the example shown in FIG. 4, the fifth terminal 170 is connected to the second terminal 48 of the communication module 32. The sixth terminal 172 is closer to the safety module 10 than the fifth terminal 170. In the example shown in FIG. 4, the sixth terminal 172 is connected to the input terminal 84 of the safety module 10.

The additional module 160 is communicably connected to various processing devices that carry out various functions. The processing devices connected to the additional module 160, for example, may be an external actuator (not shown) or an external sensor (not shown). The external actuator, for example, is another valve, a warning light, etc. The function control processing circuit 174 processes the operation control signal in order for the control device 30 to control the operation of the external actuator. The function control processing circuit 174 processes condition notification signals in order to notify the control device 30 of a condition detected by the external sensor. The function control processing circuit 174 relays the operation control signal or the condition notification signals using the operation control communication.

In the present exemplary modification, the processing device connected to the additional module 160 is the external sensor. The external sensor functions to sense conditions in relation to a fluid that is supplied by the valve modules 12 to the supply target device. The function control processing circuit 174 is placed on the fourth wiring 168. The function control processing circuit 174 outputs the condition notification signals in order to notify the control device 30 of the conditions in relation to the fluid that the valve modules 12 supply to the supply target device using the operation control communication. The control device 30 that has acquired the condition notification signals may carry out the operation control or the safety control of the valve modules 12 as necessary.

The conditions in relation to the fluid are represented, for example, by a pressure, a flow rate, and a temperature of the fluid that is supplied from the valve modules 12 to the supply target device. Data concerning the fluid pressure, the flow rate, and the temperature are obtained by the function control processing circuit 174 from the external sensor that is attached to the valve modules 12 via a non-illustrated data communication line. In the case that the supply target device includes a cylinder, the data corresponding to the conditions in relation to the fluid may be data obtained from various types of external sensors that are attached to the cylinder.

The data corresponding to the conditions in relation to the fluid are preferably obtained from many types of external sensors. In order to obtain data from many types of external sensors, a larger number of the additional modules 160, which are arranged between the communication module 32 and the safety module 10, may be provided. On the basis of the data obtained from various types of external sensors, the function control processing circuit 174, which is included in each of the plurality of additional modules 160, is capable of notifying the control device 30 of the condition notification signals.

Connection destinations of the third terminal 164, the fourth terminal 166, the fifth terminal 170, and the sixth terminal 172 will be described for a case in which the plurality of additional modules 160 are arranged between the communication module 32 and the safety module 10. Of the plurality of additional modules 160, the third terminal 164 and the fifth terminal 170 of one additional module 160 are connected respectively to the fourth terminal 166 and the sixth terminal 172 of an adjacent additional module 160.

By arranging the additional modules 160 between the communication module 32 and the safety module 10, the data corresponding to the conditions in relation to the fluid can be acquired from external sensors, and the conditions of the fluid can be monitored. In the case that the types and the number of the external sensors are increased, the number of the additional modules 160 can be increased. Furthermore, in the case that the types and the number of the external actuators are increased as well, the number of the additional modules 160 can also be increased. By providing a required number of the additional modules 160, it is possible to precisely perform processing of the signals in relation to operation controls of the external actuators, or condition notifications issued by the external sensors.

Exemplary Modification 2

In the case of there being an intruder in the surrounding vicinity of the valve modules 12, or in the vicinity of a device to which the fluid is supplied by the valve modules 12, there is a possibility that such an intruder may be placed in danger. Preferably, the intruder is detected by an external device. Detection of the intruder by the external device is notified to the control device 30 by the safety control communication. The safety control of the valve modules 12 corresponds, for example, to a control to notify the control device 30 of the detection of the intruder by the external device. The control device 30 may carry out the operation control or the safety control of the valve modules 12 as necessary.

Figure 5:
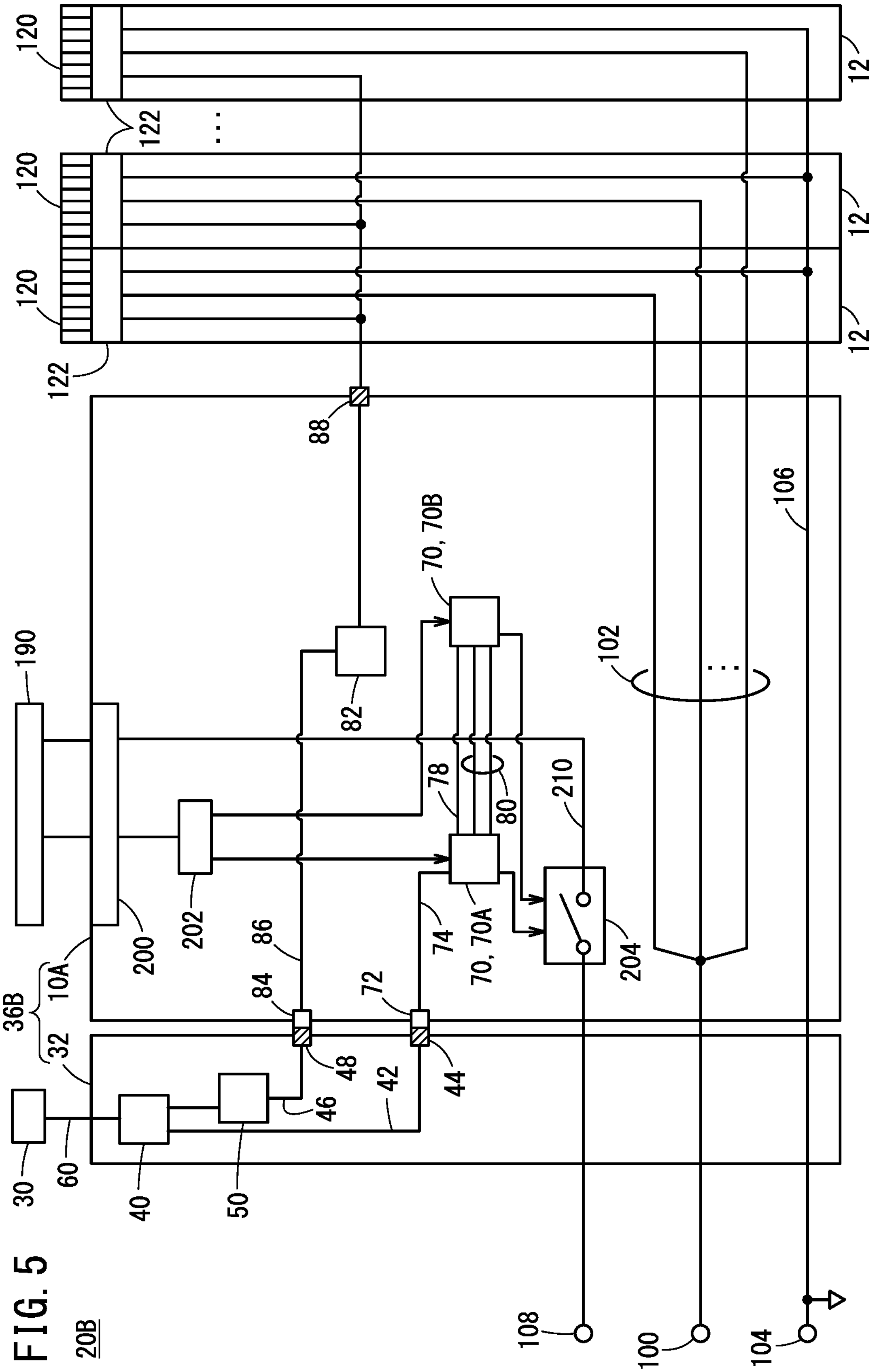
FIG. 5 is a diagram illustrating a valve system including a safety module and a plurality of valve modules according to a second exemplary modification (Exemplary Modification 2)

FIG. 5 is a diagram illustrating a valve system 20B including a safety module 10A and a plurality of valve modules 12 according to the Exemplary Modification 2. The safety module 10A and the communication module 32 are mutually connected together, and thereby constitute a module coupling body 36B. The valve system 20B further includes the control device 30, the communication module 32, and an external device 190.

The external device 190 generates a detection signal related to the safety control. The detection signal related to the safety control indicates, for example, detection of an intruder, or detection of an emergency stop instruction from the operator, or the like. The external device 190 is connected to the electrical power source 108 of the electrical power used in the controls. The external device 190 that generates the detection signal representing the detection of an intruder is a device having a sensor that detects the intruder, for example, such as a light curtain or the like. The external device 190 that generates the detection signal representing the detection of an emergency stop instruction from the operator, for example, is a button switch that the operator presses at the time of the emergency stop.

Part of the members of the safety module 10A shown in FIG. 5 is the same as that of the safety module 10 shown in FIG. 1. In FIG. 5, descriptions concerning constituent members denoted by the same reference numerals as those shown in FIG. 1 overlap with those features shown in FIG. 1, and therefore descriptions of such features are omitted herein. The safety module 10A includes the safety control processing circuit 70 (the first safety control processing circuit 70A and the second safety control processing circuit 70B), the connection terminal 72, the safety control wiring 74, the bidirectional communication line 78, the pair of unidirectional communication lines 80, the operation control processing circuit 82, the input terminal 84, the operation control wiring 86, and the output terminal 88. The safety module 10A further includes an external interface 200, a signal input circuit 202, and a second switching circuit 204.

The electrical power used in the controls which is supplied to the external device 190 is output from the external interface 200 to the external device 190. The detection signal related to the safety control which is generated by the external device 190 is input from the external device 190 to the external interface 200. The detection signal input from the external device 190 to the external interface 200 is input to the signal input circuit 202. The detection signal related to the safety control, which is input from the external device 190 to the external interface 200, is a signal represented by a voltage, for example. In that case, the signal input circuit 202, for example, is a voltage monitor. The signal input circuit 202 outputs the detection signal that has been input to the signal input circuit 202, to the safety control processing circuit 70.

The safety control processing circuit 70 issues a notification to the control device 30 by way of a safety control communication, to the effect that a detection signal related to the safety control has been input to the safety control processing circuit 70. Using a non-illustrated notification unit connected to the control device 30, the control device 30 issues a notification to the operator, to the effect that a detection signal related to the safety control has been generated by the external device 190. The notification unit is a speaker, a warning light, an indicator, or the like. By the operator operating a non-illustrated operation unit connected to the control device 30, via the operation control communication between the control device 30 and the operation control processing circuit 82, it is possible to safely cause the valve modules 12 to be stopped.

In the safety module 10A, it is also possible to check the normality of the external device 190. The second switching circuit 204 is placed on an electrical power line 210 connected to the electrical power source 108 of the electrical power used in the controls that is supplied to the external device 190. The second switching circuit 204 switches between a state of supplying the electrical power used for performing operations to the external device 190 and a state of not supplying the electrical power, in accordance with a power supply control signal that is output from the safety control processing circuit 70. The power supply control signal is a signal indicating whether or not to supply the electrical power used for controlling, to the external device 190. The safety control processing circuit 70 that outputs the power supply control signal may be either one or both of the first safety control processing circuit 70A and the second safety control processing circuit 70B.

In particular, in a case where the switching operation of the second switching circuit 204 is performed when the power supply control signal is output from both the first safety control processing circuit 70A and the second safety control processing circuit 70B, then safety is high. For example, the second switching circuit 204 becomes turned ON only in the case that the power supply control signal in order to turn ON the second switching circuit 204 is output from both the first safety control processing circuit 70A and the second safety control processing circuit 70B. Thereafter, even in the case that the first safety control processing circuit 70A has malfunctioned, the second safety control processing circuit 70B outputs the power supply control signal in order to turn OFF the second switching circuit 204, whereby the second switching circuit 204 can be turned OFF.

On the basis of the safety control communication, the safety control processing circuit 70 outputs the power supply control signal to the second switching circuit 204. By outputting the power supply control signal, the safety control processing circuit 70 turns ON or turns OFF the second switching circuit 204. FIG. 5 shows an example in which the second switching circuit 204 is turned OFF.

In accordance with the power supply control signal output from the safety control processing circuit 70, the second switching circuit 204 can momentarily interrupt the supply of electrical power to the external device 190. In that case, the external device 190 detects the momentary interruption of the supply of electrical power. The external device 190 generates the detection signal related to the safety control in response to the detected momentary interruption of the supply of electrical power.

The detection signal related to the safety control which is generated by the external device 190 is input from the external device 190 to the signal input circuit 202 via the external interface 200. The signal input circuit 202 outputs the detection signal related to the safety control that has been input to the signal input circuit 202, to the safety control processing circuit 70. The safety control processing circuit 70 generates information in relation to the normality of the external device 190, based on the detection signal input to the signal input circuit 202, and the power supply control signal output to the second switching circuit 204. By way of the safety control communication, the safety control processing circuit 70 notifies the control device 30 of the information in relation to the normality of the external device 190.

The information in relation to the normality of the external device 190 indicates whether the external device 190 operates normally or abnormally. Concerning the momentary interruption of the supply of electrical power to the external device 190, in the case that the content indicated by the power supply control signal and the content indicated by the detection signal coincide, the external device 190 is considered to operate normally. In the case that the content indicated by the power supply control signal and the content indicated by the detection signal do not coincide, the external device 190 is considered to operate abnormally. Moreover, whether or not the content indicated by the power supply control signal and the content indicated by the detection signal coincide may be detected by either one or both of the first safety control processing circuit 70A and the second safety control processing circuit 70B.

A voltage monitor may be arranged on the electrical power line 210 at a position between the second switching circuit 204 and the external interface 200. The voltage measured by the voltage monitor on the electrical power line 210 may be used to generate information in relation to the normality of the external device 190. In that case, the safety control processing circuit 70 generates the information in relation to the normality of the external device 190, based on the detection signal input to the signal input circuit 202, the power supply control signal output to the second switching circuit 204, and the voltage measured by the voltage monitor on the electrical power line 210. Whether or not the measured voltage, the content indicated by the power supply control signal, and the content indicated by the detection signal coincide may be detected by either one or both of the first safety control processing circuit 70A and the second safety control processing circuit 70B.

Concerning the momentary interruption of the supply of electrical power to the external device 190, in the case that the voltage measured by the voltage monitor on the electrical power line 210 and the voltage represented as the detection signal coincide, the external device 190 is considered to be normal. In the case that the voltage measured by the voltage monitor on the electrical power line 210 and the voltage represented as the detection signal do not coincide, the external device 190 is considered to be abnormal.

As the information in relation to the normality of the external device 190, in the case that a notification is issued of an abnormality in the external device 190, the control device 30 informs the operator of the abnormality of the external device 190. By the operator operating the control device 30, via the operation control communication between the control device 30 and the operation control processing circuit 82, it is possible to safely cause the valve modules 12 to be stopped. Moreover, it should be noted that, in the case that a notification is issued of an abnormality in the external device 190, the control device 30 may automatically and safely stop the valve modules 12 without any operations made by the operator.

In the safety module 10A according to the present exemplary modification, the detection signal related to the safety control is input from the external device 190 to the signal input circuit 202. The safety control processing circuit 70 notifies the control device 30 of the input of the detection signal, by way of a safety control communication.

In the case that the second switching circuit 204 has interrupted the supply of electrical power to the external device 190, the safety control processing circuit 70 generates information in relation to the normality of the external device 190. The information in relation to the normality of the external device 190 is generated on the basis of the detection signal input to the signal input circuit 202, and the power supply control signal output to the second switching circuit 204. By way of the safety control communication, the safety control processing circuit 70 notifies the control device 30 of the information in relation to the normality of the external device 190.

Moreover, it should be noted that, in the case that the external device 190 includes a function as an output signal switching device, a generation process by which information in relation to the normality of the external device 190 is generated by the safety control processing circuit 70 is not necessarily needed. Thus, such a generation process may be prohibited by the operator operating the control device 30.

Exemplary Modification 3

The safety control of the valve modules 12 may be a control to interrupt the power used for performing operations, a control to cause the valve modules 12 to be safely stopped, and a control to issue, to the control device 30, a notification of the detection of an intruder. More specifically, the constituent members of the safety module 10 according to the above-described embodiment, and the constituent members of the safety module 10A according to the Exemplary Modification 2 may be combined.

Figure 6:
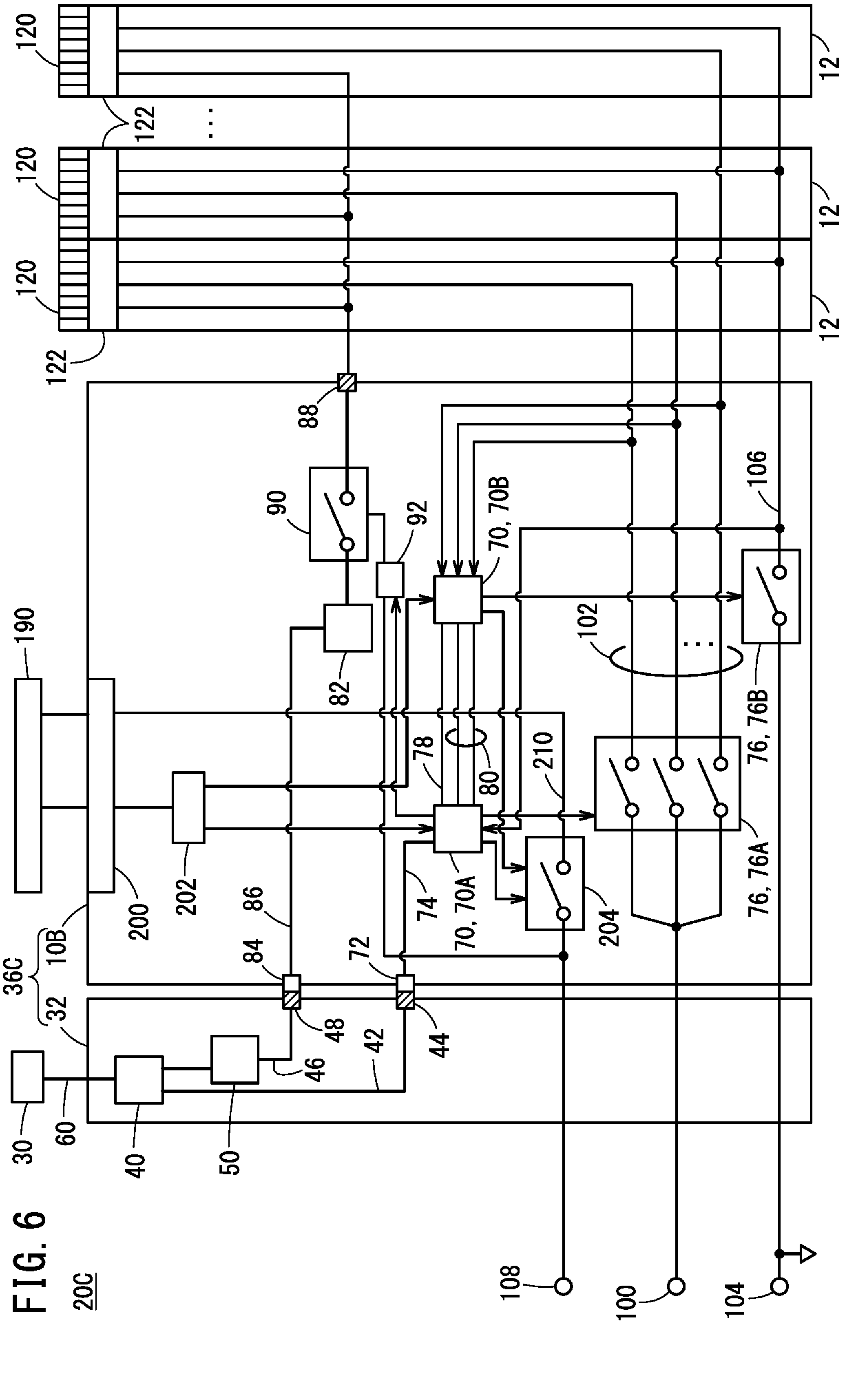
FIG. 6 is a diagram illustrating a valve system including a safety module and a plurality of valve modules according to a third exemplary modification (Exemplary Modification 3)

FIG. 6 is a diagram illustrating a valve system 20C including a safety module 10B and a plurality of valve modules 12 according to the Exemplary Modification 3. The safety module 10B and the communication module 32 are mutually connected together, and thereby constitute a module coupling body 36C. The valve system 20C further includes the control device 30, the communication module 32, and the external device 190.

Part of the members of the safety module 10B shown in FIG. 6 is the same as that of the safety module 10 shown in FIG. 1. The remaining members possessed by the safety module 10B shown in FIG. 6 are the same as in the safety module 10A shown in FIG. 5. Descriptions of the members shown in FIG. 6 are omitted, since these features have been described above using FIG. 1 or FIG. 5. The safety module 10B shown in FIG. 6 functions as the safety module 10 shown in FIG. 1, and together therewith, also functions as the safety module 10A shown in FIG. 5.

Exemplary Modification 4

The safety module 10 in the embodiment described above, the safety module 10 in Exemplary Modification 1, the safety module 10A in Exemplary Modification 2, and the safety module 10B in Exemplary Modification 3 may be interchanged with each other.

For example, the safety module 10 connected to the communication module 32 of the module coupling body 36 according to the above-described embodiment can be replaced by the safety module 10A in Exemplary Modification 2. In accordance with this feature, the module coupling body 36B shown in FIG. 5 is obtained. The connection terminal 72 of the safety module 10A is connected to the first terminal 44 of the communication module 32. The input terminal 84 of the safety module 10A is connected to the second terminal 48 of the communication module 32. By the connection between the connection terminal 72 and the first terminal 44 and the connection between the input terminal 84 and the second terminal 48, the communication module 32 is coupled to the safety module 10A.

The safety module 10 connected to the communication module 32 of the module coupling body 36 according to the above-described embodiment can be replaced by the safety module 10B in Exemplary Modification 3. In accordance with this feature, the module coupling body 36C shown in FIG. 6 is obtained. The connection terminal 72 of the safety module 10B is connected to the first terminal 44 of the communication module 32. The input terminal 84 of the safety module 10B is connected to the second terminal 48 of the communication module 32. By the connection between the connection terminal 72 and the first terminal 44 and the connection between the input terminal 84 and the second terminal 48, the communication module 32 is coupled to the safety module 10B.

Figure 7:
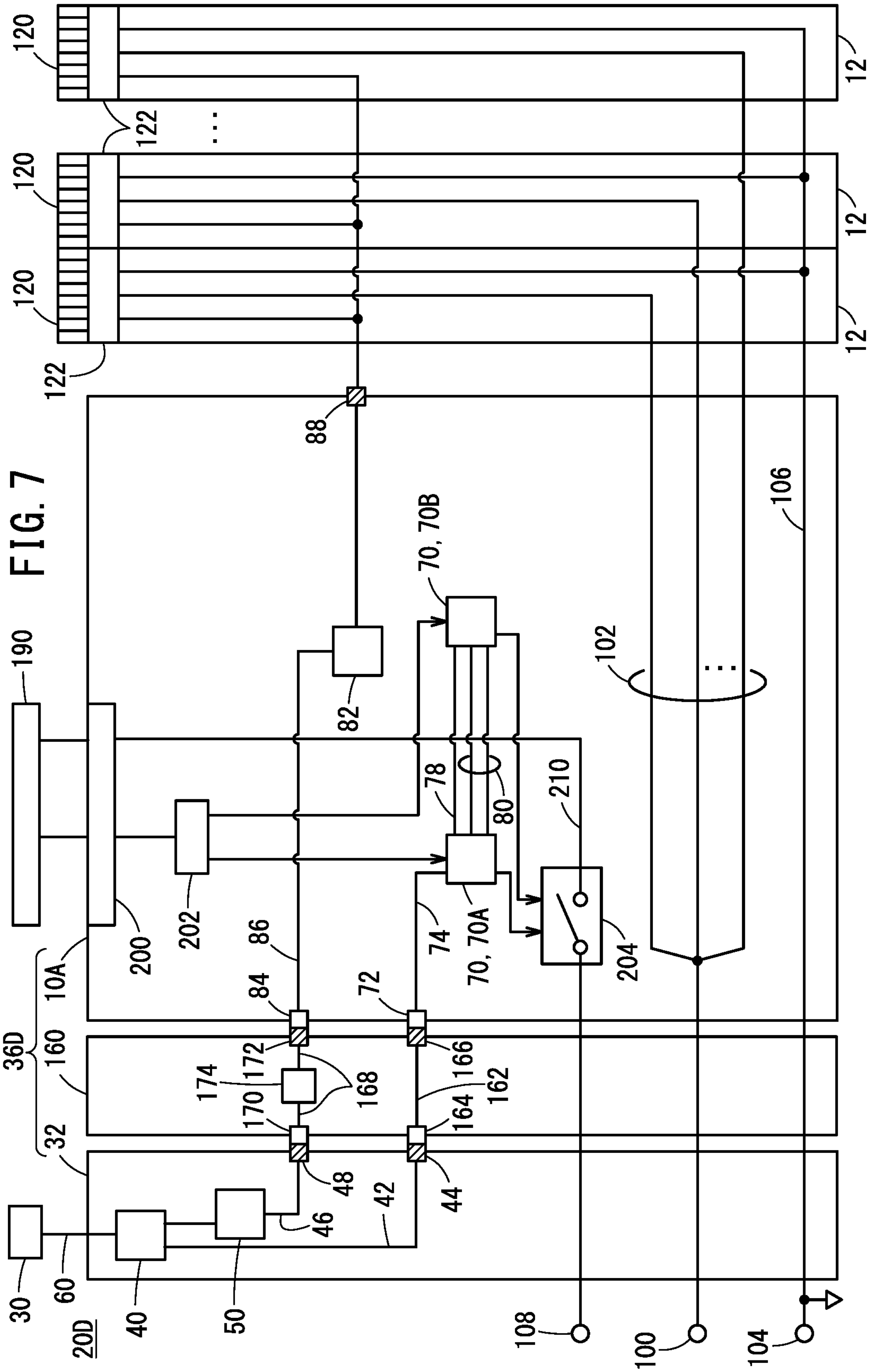
FIG. 7 is a diagram for describing an example of a fourth exemplary modification (Exemplary Modification 4) in which the valve system includes the safety module according to the Exemplary Modification 2.

Further, the safety module 10 of the module coupling body 36A in Exemplary Modification 1 may be replaced by the safety module 10A in Exemplary Modification 2. FIG. 7 is a diagram for describing an example of an Exemplary Modification 4 in which a valve system 20D includes a safety module 10A according to the Exemplary Modification 2. A module coupling body 36D is constituted by the safety module 10A, the additional module 160, and the communication module 32.

The connection terminal 72 of the safety module 10A is connected to the fourth terminal 166 of the additional module 160. The input terminal 84 of the safety module 10A is connected to the sixth terminal 172 of the additional module 160. By the connection between the connection terminal 72 and the fourth terminal 166 and the connection between the input terminal 84 and the sixth terminal 172, the additional module 160 is coupled to the safety module 10A.

Figure 8:
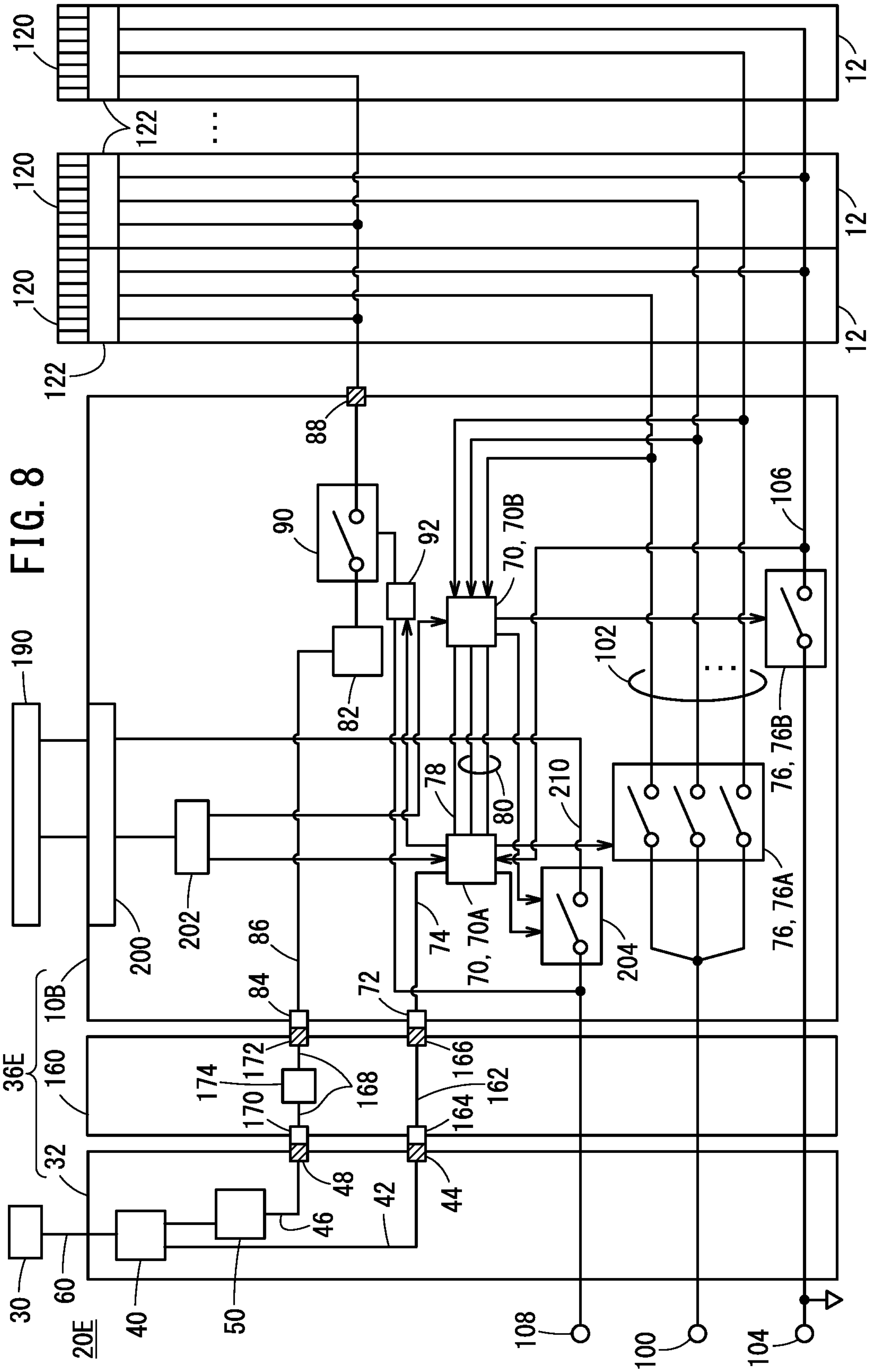
FIG. 8 is a diagram for describing another example of the Exemplary Modification 4 in which the valve system includes the safety module according to the Exemplary Modification 3.

The safety module 10 of the module coupling body 36A in the Exemplary Modification 1 may be replaced by the safety module 10B in Exemplary Modification 3. FIG. 8 is a diagram for describing another example of the Exemplary Modification 4 in which a valve system 20E includes a safety module 10B according to the Exemplary Modification 3. A module coupling body 36E is constituted by the safety module 10B, the additional module 160, and the communication module 32.

The connection terminal 72 of the safety module 10B is connected to the fourth terminal 166 of the additional module 160. The input terminal 84 of the safety module 10B is connected to the sixth terminal 172 of the additional module 160. By the connection between the connection terminal 72 and the fourth terminal 166 and the connection between the input terminal 84 and the sixth terminal 172, the additional module 160 is coupled to the safety module 10B.

Figure 9C:
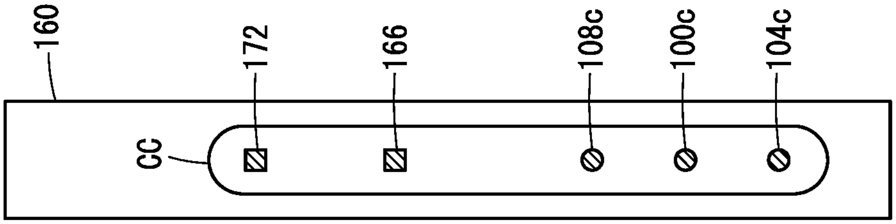
FIG. 9C is a diagram illustrating a connector of the additional module.
Figure 9B:
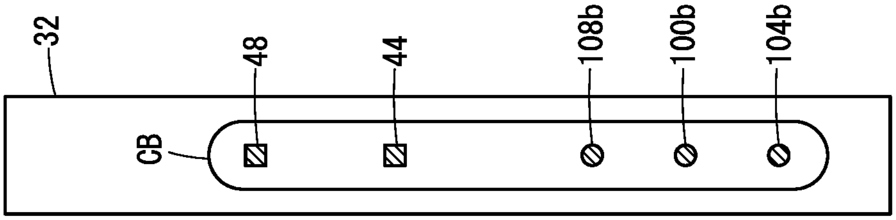
FIG. 9B is a diagram illustrating a connector of the communication module.
Figure 9A:
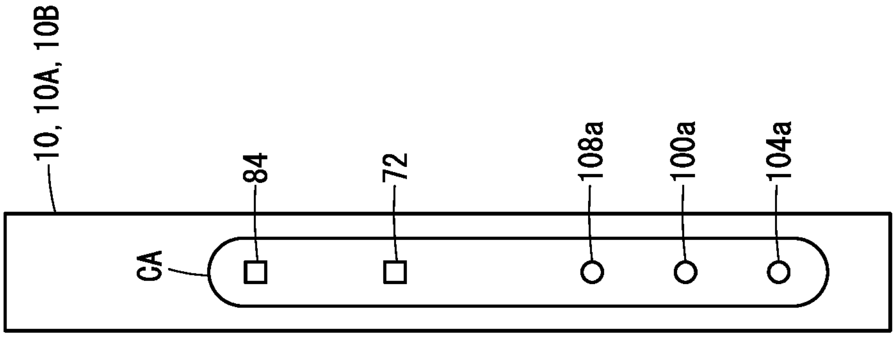
FIG. 9A is a diagram illustrating a connector that three types of safety modules each have and that is common to the three types.

FIG. 9A is a diagram illustrating a connector that three types of the safety modules 10, 10A, and 10B each have and is common to the three types. A connector CA provided on each of the safety modules of the three types of the safety modules 10, 10A and 10B engages mutually with a connector provided on an adjacent module that lies adjacent to the safety module. The adjacent module includes the communication module 32 or the additional module 160, as have been described above. The present modification will be described using the safety module 10, however, the same applies to the case of the description in which the safety module 10A or 10B is used.

The connector CA includes the connection terminal 72, the input terminal 84, a power supply terminal 100*a*, a power supply terminal 104*a*, and a power supply terminal 108*a*. The power supply terminal 100*a* is electrically connected to the positive electrode 100 of the electrical power source of the electrical power used for performing operations, via an electrical power line or the like. The power supply terminal 104*a* is electrically connected to the negative electrode 104 of the electrical power source of the electrical power used for performing operations, via an electrical power line or the like. The power supply terminal 108*a* is electrically connected to the electrical power source 108 of the electrical power used in the controls, via an electrical power line or the like.

FIG. 9B is a diagram illustrating a connector CB of the communication module 32. In the case that the additional module 160 is not arranged between the communication module 32 and the safety module 10, the adjacent module that lies adjacent to the safety module 10 is the communication module 32. Accordingly, the connector CB provided on the communication module 32 engages mutually with the connector CA provided on the safety module 10. By the connector CA of the safety module 10 and the connector CB of the communication module 32 being in engagement, the safety module 10 and the communication module 32 are mutually connected together.

The connector CB includes the first terminal 44, the second terminal 48, a power supply terminal 100*b*, a power supply terminal 104*b*, and a power supply terminal 108*b*. The power supply terminal 100*b* is electrically connected to the positive electrode 100 of the electrical power source of the electrical power used for performing operations, via an electrical power line or the like. The power supply terminal 104*b* is electrically connected to the negative electrode 104 of the electrical power source of the electrical power used for performing operations, via an electrical power line or the like. The power supply terminal 108*b* is electrically connected to the electrical power source 108 of the electrical power used in the controls, via an electrical power line or the like.

The positions of the terminals in the connector CA of the safety module 10 correspond respectively to the positions of the terminals in the connector CB of the communication module 32. Accordingly, by the connector CA of the safety module 10 and the connector CB of the communication module 32 being engaged with each other, the corresponding terminals are connected to each other.

More specifically, the connection terminal 72 of the safety module 10 is connected to the first terminal 44 of the communication module 32. The input terminal 84 of the safety module 10 is connected to the second terminal 48 of the communication module 32. The power supply terminal 100*a* of the safety module 10 and the power supply terminal 100*b* of the communication module 32 are connected. The power supply terminal 104*a* of the safety module 10 and the power supply terminal 104*b* of the communication module 32 are connected. The power supply terminal 108*a* of the safety module 10 and the power supply terminal 108*b* of the communication module 32 are connected.

FIG. 9C is a diagram illustrating a connector CC of the additional module 160. In the case that the additional module 160 is arranged between the communication module 32 and the safety module 10, the adjacent module that lies adjacent to the safety module 10 is the additional module 160. Accordingly, the connector CC provided on the additional module 160 engages mutually with the connector CA provided on the safety module 10. By the connector CA of the safety module 10 and the connector CC of the additional module 160 being in engagement, the safety module 10 and the additional module 160 are mutually connected together.

The connector CC includes the fourth terminal 166, the sixth terminal 172, a power supply terminal 100*c*, a power supply terminal 104*c*, and a power supply terminal 108*c*. The power supply terminal 100*c* is electrically connected to the positive electrode 100 of the electrical power source of the electrical power used for performing operations, via an electrical power line or the like. The power supply terminal 104*c* is electrically connected to the negative electrode 104 of the electrical power source of the electrical power used for performing operations, via an electrical power line or the like. The power supply terminal 108*c* is electrically connected to the electrical power source 108 of the electrical power used in the controls, via an electrical power line or the like.

The positions of the terminals in the connector CA of the safety module 10 correspond respectively to the positions of the terminals in the connector CC of the additional module 160. Accordingly, by the connector CA of the safety module 10 and the connector CC of the additional module 160 being engaged with each other, the corresponding terminals are connected to each other.

More specifically, the connection terminal 72 of the safety module 10 is connected to the fourth terminal 166 of the additional module 160. The input terminal 84 of the safety module 10 is connected to the sixth terminal 172 of the additional module 160. The power supply terminal 100*a* of the safety module 10 and the power supply terminal 100*c* of the additional module 160 are connected. The power supply terminal 104*a* of the safety module 10 and the power supply terminal 104*c* of the additional module 160 are connected. The power supply terminal 108*a* of the safety module 10 and the power supply terminal 108*c* of the additional module 160 are connected.

As noted previously, the three types of the safety modules 10, 10A, and 10B each include the connector CA having the same structure as that shown in FIG. 9A. Accordingly, the safety module 10 is capable of being replaced by the safety module 10A, and the safety module 10 is capable of being replaced by the safety module 10B. The safety module 10A is capable of being replaced by the safety module 10A, and the safety module 10 is capable of being replaced by the safety module 10B. The safety module 10B is capable of being replaced by the safety module 10, and the safety module 10B is capable of being replaced by the safety module 10A.

By replacing the safety module, it is possible to provide the module coupling body which can be used in a variety of applications corresponding to the respective types of safety modules.

Inventions Obtained from the Embodiment

The inventions that can be grasped from the above-described embodiments and the exemplary modifications will be described below.

(1) The safety module (10, 10A, 10B) which is capable of communicating with the control device (30) that performs the control on the valve modules (12) includes the safety control processing circuit (70) that carries out the safety control communication in relation to the safety control of the valve modules, with the control device, the connection terminal (72) used in the safety control communication between the control device and the safety control processing circuit, the safety control wiring (74) that connects the safety control processing circuit and the connection terminal, and which is used in the safety control communication, the operation control processing circuit (82) that performs, with the control device, the operation control communication in relation to an operation control that differs from the safety control of the valve modules, and that outputs the operation control signal for the valve modules, on the basis of the operation control communication, the input terminal (84) to which the operation control communication between the control device and the operation control processing circuit is input, the operation control wiring (86) that serves to connect the operation control processing circuit and the input terminal, and which is used in the operation control communication, and the output terminal (88) which is capable of outputting the operation control signal that has been output from the operation control processing circuit, to the valve modules. In accordance with such features, in the safety module, an adverse influence of the operation control communication on the safety control communication can be suppressed.

(2) The safety module may further include the first switching circuit (76) which is capable of supplying the electrical power for operation, to the valve modules, wherein the safety control processing circuit may output the safety control signal for the safety control, on the basis of the safety control communication, and the first switching circuit may switch between a state of supplying the electrical power for operation to the valve modules, and a state of not supplying the electrical power for operation to the valve module, in accordance with the safety control signal that has been output from the safety control processing circuit. In accordance with such features, the safety control of the valve modules can be performed.

(3) The first switching circuit may include the high side switch (76A) connected to the electrical power source of the valve modules, and the low side switch (76B) connected to ground, in the case that the safety control signal is the ON signal, both the high side switch and the low side switch may be turned ON, whereby the electrical power for operation is supplied to the valve modules, and in the case that the safety control signal is the OFF signal, at least one of the high side switch or the low side switch may be turned OFF, whereby supply of the electrical power for operation to the valve modules may be interrupted. In accordance with such features, a safe supply of the electrical power used for performing operations to the valve modules is realized.

(4) The safety module may further include the signal output circuit (90) that switches between a state of outputting the operation control signal that has been output from the operation control processing circuit, to the valve modules via the output terminal and a state of not outputting the operation control signal, in accordance with the safety control signal that has been output from the safety control processing circuit, wherein, in the case that the safety control signal is the ON signal, the signal output circuit may output the operation control signal to the valve modules, and in the case that the safety control signal is the OFF signal, the signal output circuit need not output the operation control signal to the valve modules. In accordance with such features, the safety of the valve system is increased.

(5) The safety module may further include the signal input circuit (202) to which the detection signal related to the safety control is input from the external device (190) that generates the detection signal, and the second switching circuit (204) that switches between supply and non-supply of the electrical power to the external device, in accordance with the power supply control signal that is output from the safety control processing circuit on the basis of the safety control communication, wherein, in the case that the second switching circuit interrupts the supply of the electrical power to the external device in accordance with the power supply control signal, the safety control processing circuit may issue, to the control device, a notification of information in relation to the normality of the external device, via the safety control communication, on the basis of the power supply control signal and the detection signal input to the signal input circuit. In accordance with such features, and opportunity to safely cause the valve modules to be stopped can be obtained.

(6) The safety control processing circuit may include the first safety control processing circuit (70A) that carries out the safety control communication with the control device, together with turning ON or turning OFF the high side switch, and the second safety control processing circuit (70B) that carries out the safety control communication with the control device via the first safety control processing circuit, together with turning ON or turning OFF the low side switch, wherein, in the case that the safety control signal output by the first safety control processing circuit is the ON signal, the high side switch may be turned ON, in the case that the safety control signal output by the first safety control processing circuit is the OFF signal, the high side switch may be turned OFF, in the case that the safety control signal output by the second safety control processing circuit is the ON signal, the low side switch may be turned ON, and in the case that the safety control signal output by the second safety control processing circuit is the OFF signal, the low side switch may be turned OFF. In accordance with such features, the safety control of the valve modules can be more appropriately performed.

(7) The safety module may further include the bidirectional communication line (78) and the pair of unidirectional communication lines (80) provided between the first safety control processing circuit and the second safety control processing circuit in order to enable communications between the first safety control processing circuit and the second safety control processing circuit, wherein each of the first safety control processing circuit and the second safety control processing circuit may include the safety layer protocol processing unit (146) that performs the safety layer protocol process in relation to the safety of the communications in the pair of unidirectional communication lines. In accordance with such features, since a general-purpose communication protocol can be applied to the communications via the pair of unidirectional communication lines, the degree of freedom in relation to designing the communication method is high.

(8) The module coupling body (36, 36A) includes the above-described safety module, and the communication module (32) including the control communication processing circuit (40) that relays the safety control communication and the operation control communication, the first wiring (42) used in the safety control communication relayed by the control communication processing circuit, the first terminal (44) connected to the first wiring, the second wiring (46) used in the operation control communication relayed by the control communication processing circuit, and the second terminal (48) connected to the second wiring, and the communication module is disposed between the control device and the safety module and connected with the safety module. In accordance with such features, the control device can perform the safety control and the operation control of the valve modules in parallel.

(9) The module coupling body may further include at least one additional module (160) including the third wiring (162) used in the safety control communication, the third terminal (164) connected to the one end of the third wiring, the fourth terminal (166) connected to the other end of the third wiring, the fourth wiring (168) used in the operation control communication, the fifth terminal (170) connected to the one end of the fourth wiring, the sixth terminal (172) connected to the other end of the fourth wiring, and the function control processing circuit (174) disposed on the fourth wiring, and which processes the operation control signal for causing the control device to control the operations of the external actuators, or the condition notification signals for issuing, to the control device, a notification of the condition detected by the external sensors, and the at least one additional module may be disposed between the communication module and the safety module and is connected with the communication module and the safety module. In accordance with such features, it is possible to precisely perform processing of signals in relation to the operation controls of the external actuators, or the condition notifications issued by the external sensors.

(10) The communication module may be connected to the safety module, by the connection terminal of the safety module and the first terminal of the communication module being connected, and in addition, by the input terminal of the safety module and the second terminal of the communication module being connected, and the safety module may be capable of being replaced. By replacing the safety module, it is possible to provide the module coupling body which can be used in a variety of applications.

(11) The additional module may be connected to the safety module, by the connection terminal of the safety module and the fourth terminal of the additional module adjacent to the safety module from among the at least one additional module being connected, and in addition, by the input terminal of the safety module and the sixth terminal of the additional module adjacent to the safety module being connected. In addition, the safety module may be capable of being replaced. By replacing the safety module, it is possible to provide the module coupling body which can be used in a variety of applications.

Moreover, it should be noted that the present invention is not limited to the disclosure described above, and various alternative or additional configurations can be adopted therein without departing from the essence and gist of the present invention.

The invention claimed is:

1. A safety module configured to communicate with a control device configured to perform a control on a valve module, the safety module comprising:

a safety control processing circuit configured to carry out a safety control communication in relation to a safety control of the valve module, with the control device;

a connection terminal configured to be used in the safety control communication between the control device and the safety control processing circuit;

a safety control wiring configured to connect the safety control processing circuit and the connection terminal, and to be used in the safety control communication;

an operation control processing circuit configured to perform, with the control device, an operation control communication in relation to an operation control that differs from the safety control of the valve module, and to output an operation control signal for the valve module, based on the operation control communication;

an input terminal to which the operation control communication between the control device and the operation control processing circuit is input, the input terminal being distinct from the connection terminal;

an operation control wiring provided separately from the safety control wiring without being connected to the safety control wiring and configured to connect the operation control processing circuit and the input terminal, and to be used in the operation control communication; and an output terminal configured to output the operation control signal that has been output from the operation control processing circuit, to the valve module.

2. The safety module according to claim 1, further comprising:

a first switching circuit configured to supply an electrical power for operation, to the valve module;

wherein the safety control processing circuit outputs a safety control signal for the safety control, based on the safety control communication; and the first switching circuit switches between a state of supplying the electrical power for operation to the valve module, and a state of not supplying the electrical power for operation to the valve module, in accordance with the safety control signal that has been output from the safety control processing circuit.

3. The safety module according to claim 2, wherein:

the first switching circuit includes a high side switch connected to an electrical power source of the valve module, and a low side switch connected to ground;

in a case that the safety control signal is an ON signal, both the high side switch and the low side switch are turned ON, whereby the electrical power for operation is supplied to the valve module; and in a case that the safety control signal is an OFF signal, at least one of the high side switch or the low side switch is turned off, whereby supply of the electrical power for operation to the valve module is interrupted.

4. The safety module according to claim 2, further comprising:

a signal output circuit configured to switch between a state of outputting the operation control signal that has been output from the operation control processing circuit, to the valve module via the output terminal and a state of not outputting the operation control signal, in accordance with the safety control signal that has been output from the safety control processing circuit;

wherein, in a case that the safety control signal is an ON signal, the signal output circuit outputs the operation control signal to the valve module, and in a case that the safety control signal is an OFF signal, the signal output circuit does not output the operation control signal to the valve module.

5. The safety module according to claim 1, further comprising:

a signal input circuit to which a detection signal related to the safety control is input from an external device configured to generate the detection signal; and a second switching circuit configured to switch between a state of supplying electrical power to the external device and a state of not supplying the electrical power thereto, in accordance with a power supply control signal that is output from the safety control processing circuit based on the safety control communication;

wherein, in a case that the second switching circuit interrupts supply of the electrical power to the external device in accordance with the power supply control signal, the safety control processing circuit issues, to the control device, a notification of information in relation to normality of the external device, via the safety control communication, based on the power supply control signal and the detection signal input to the signal input circuit.

6. The safety module according to claim 2, further comprising:

a signal input circuit to which a detection signal related to the safety control is input from an external device configured to generate the detection signal; and a second switching circuit configured to switch between a state of supplying electrical power to the external device and a state of not supplying the electrical power thereto, in accordance with a power supply control signal that is output from the safety control processing circuit based on the safety control communication;

wherein, in a case that the second switching circuit interrupts supply of the electrical power to the external device in accordance with the power supply control signal, the safety control processing circuit issues, to the control device, a notification of information in relation to normality of the external device, via the safety control communication, based on the power supply control signal and the detection signal input to the signal input circuit.

7. The safety module according to claim 3, wherein:

the safety control processing circuit includes a first safety control processing circuit configured to perform the safety control communication with the control device, and to turn ON or turn OFF the high side switch, and a second safety control processing circuit configured to perform the safety control communication with the control device via the first safety control processing circuit, and to turn ON or turn OFF the low side switch;

in a case that the safety control signal output by the first safety control processing circuit is the ON signal, the high side switch is turned ON;

in a case that the safety control signal output by the first safety control processing circuit is the OFF signal, the high side switch is turned OFF;

in a case that the safety control signal output by the second safety control processing circuit is the ON signal, the low side switch is turned ON; and in a case that the safety control signal output by the second safety control processing circuit is the OFF signal, the low side switch is turned OFF.

8. The safety module according to claim 7, further comprising:

a bidirectional communication line and a pair of unidirectional communication lines provided between the first safety control processing circuit and the second safety control processing circuit in order to enable communications between the first safety control processing circuit and the second safety control processing circuit;

wherein each of the first safety control processing circuit and the second safety control processing circuit includes a safety layer protocol processing unit configured to perform a safety layer protocol process in relation to safety of the communications in the pair of unidirectional communication lines.

9. A module coupling body, comprising:

a safety module; and a communication module, wherein the safety module is configured to communicate with a control device configured to perform a control on a valve module, the safety module comprising:

a safety control processing circuit configured to carry out a safety control communication in relation to a safety control of the valve module, with the control device;

a connection terminal configured to be used in the safety control communication between the control device and the safety control processing circuit;

a safety control wiring configured to connect the safety control processing circuit and the connection terminal, and to be used in the safety control communication;

an operation control processing circuit configured to perform, with the control device, an operation control communication in relation to an operation control that differs from the safety control of the valve module, and to output an operation control signal for the valve module, based on the operation control communication;

an input terminal to which the operation control communication between the control device and the operation control processing circuit is input, the input terminal being distinct from the connection terminal;

an operation control wiring provided separately from the safety control wiring without being connected to the safety control wiring and configured to connect the operation control processing circuit and the input terminal, and to be used in the operation control communication; and an output terminal configured to output the operation control signal that has been output from the operation control processing circuit, to the valve module, and wherein the communication module includes a control communication processing circuit configured to relay the safety control communication and the operation control communication, a first wiring used in the safety control communication relayed by the control communication processing circuit, a first terminal connected to the first wiring, a second wiring used in the operation control communication relayed by the control communication processing circuit, and a second terminal connected to the second wiring, wherein the communication module is disposed between the control device and the safety module and connected with the safety module.

10. The module coupling body according to claim 9, further comprising at least one additional module including a third wiring used in the safety control communication, a third terminal connected to one end of the third wiring, a fourth terminal connected to another end of the third wiring, a fourth wiring used in the operation control communication, a fifth terminal connected to one end of the fourth wiring, a sixth terminal connected to another end of the fourth wiring, and a function control processing circuit disposed on the fourth wiring, and configured to process an operation control signal that causes the control device to control an operation of an external actuator, or a condition notification signal that issues, to the control device, a notification of a condition detected by an external sensor, wherein the at least one additional module is disposed between the communication module and the safety module and is connected with the communication module and the safety module.

11. The module coupling body according to claim 9, wherein:

the communication module is connected to the safety module, by the connection terminal of the safety module and the first terminal of the communication module being connected, and in addition, by the input terminal of the safety module and the second terminal of the communication module being connected; and the safety module is replaceable.

12. The module coupling body according to claim 10, wherein:

the additional module is connected to the safety module, by the connection terminal of the safety module and the fourth terminal of an additional module adjacent to the safety module from among the at least one additional module being connected, and in addition, by the input terminal of the safety module and the sixth terminal of the additional module adjacent to the safety module being connected; and the safety module is replaceable.

* * * * *